United States Patent [19]

Fujimori et al.

[11] Patent Number: 4,476,832
[45] Date of Patent: Oct. 16, 1984

[54] TIMING CONTROL DEVICE FOR A FUEL INJECTION PUMP

[75] Inventors: Kyoichi Fujimori, Higashimatsuyama; Masami Okano, Kawagoe, both of Japan

[73] Assignee: Diesel Kiki Co., Ltd., Japan

[21] Appl. No.: 512,407

[22] Filed: Jul. 8, 1983

[30] Foreign Application Priority Data

Jul. 16, 1982 [JP] Japan .................................. 57-122829

[51] Int. Cl.³ .......................................... F02M 59/20
[52] U.S. Cl. ..................................... 123/502; 123/357
[58] Field of Search .............. 123/501, 502, 357, 372; 251/129; 239/585

[56] References Cited

U.S. PATENT DOCUMENTS

| | | | |
|---|---|---|---|
| 4,265,200 | 5/1981 | Wessel et al. ........................ | 123/501 |
| 4,355,621 | 10/1982 | Yasuhara .............................. | 123/502 |
| 4,395,905 | 8/1983 | Fujimori et al. ..................... | 123/502 |
| 4,397,285 | 8/1983 | O'Neill ................................. | 123/502 |

FOREIGN PATENT DOCUMENTS 97024  6/1982  Japan .................................. 123/502

Primary Examiner—Magdalen Y. C. Moy
Attorney, Agent, or Firm—Guy W. Shoup

[57] ABSTRACT

In a timing control device of a fuel injection pump which is so arranged that the fuel injection timing is adjusted in accordance with the duty ratio of a driving pulse signal applied to a timing valve, the frequency of the driving pulse signal is controlled in response to data showing the rotational speed of the fuel injection pump in such a way that the resonating phenomenon does not occur whereby the timer can be actuated smoothly without resonation of the timer.

8 Claims, 10 Drawing Figures

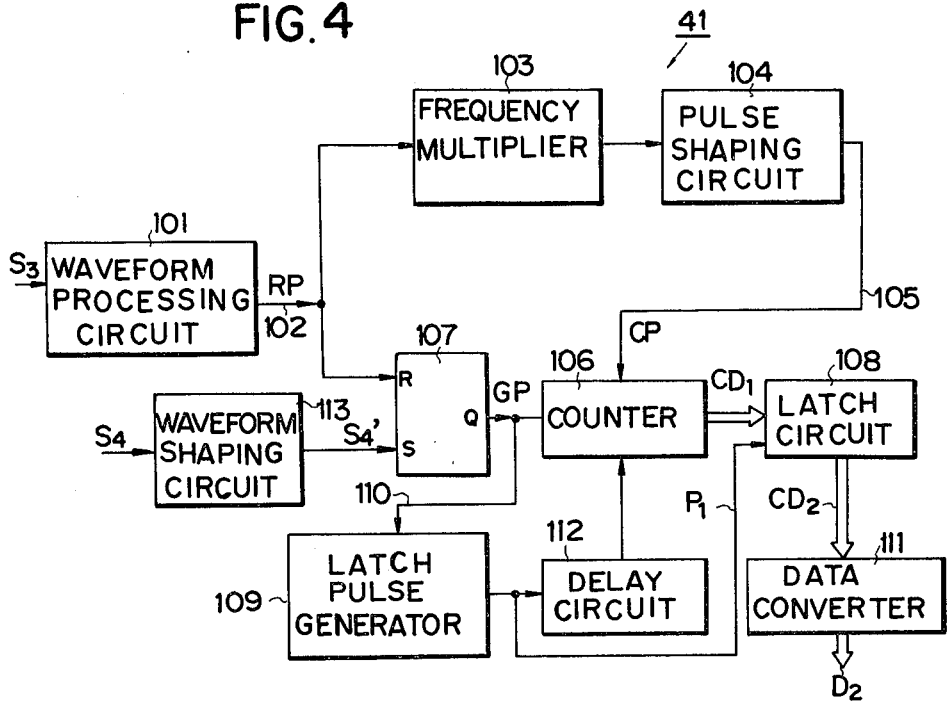
FIG. 4
FIG. 5A S4'
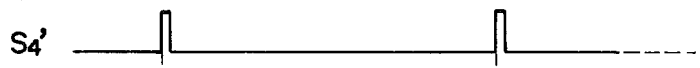
FIG. 5B RP
FIG. 5C Q (GP)
FIG. 5D CP
FIG. 5E P1
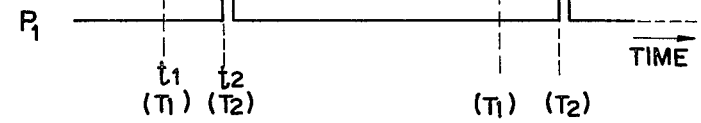

TIMING CONTROL DEVICE FOR A FUEL INJECTION PUMP

The present invention relates to a timing control device for controlling the injection timing of a fuel injection pump for internal combustion engines.

A hydraulic type timer which utilizes hydraulic power and has a timing solenoid valve has been widely used as one of the timing control devices for a fuel injection pump. In such a hydraulic type timer, the timing solenoid valve is driven by a driving pulse signal and the average hydraulic pressure applied to the timer piston is adjusted by the change of the duty ratio of the driving pulse signal applied to the timing solenoid valve. As a result, a desired injection advance can be obtained. However, since in such a conventional timing control device, the timing solenoid valve is actuated to open/close by the application of the pulse signal with a constant period, and the adjustment of the injection advance is carried out in response to the duty ratio of the driving pulse signal, it has the disadvantage of moving unstably due to resonating phenomenon when the rotational speed of an injection pump actuated by the engine is in a specific speed range. That is, since the reacting force is produced and presses a roller holder every time a disc cam presses rollers and a plunger is pushed in the side of the fuel injection pump, when the ratio between the period of the reacting force and the pulsating period of the pressure in a high pressure chamber of the timer caused by opening/closing operation of a timing solenoid valve becomes an integral value, a resonating phenomenon occurs, so that the operation for adjusting the injection timing becomes unstable. For example, in an engine with six cylinders, when a driving pulse signal with a period of 20 (ms) is used, the reacting period of the above mentioned reacting force will be 10 (ms) and 5 (ms) at engine speeds of 1000 (r.p.m) and 2000 (r.p.m), respectively, so that the timer will be unstable. To eliminate this disadvantage, there has been proposed a device in which a plurality of oscillators whose output frequencies are different from each other are provided and the output signal from one of the oscillators is used for controlling the driving pulse signal so as to avoid the occurrence of the resonating phenomenon. However, since resonating zones are close together, especially in the low engine speed zone, the above proposed device has one disadvantage in that the switching of the frequency of driving pulse signal must be carried out frequently in the low speed zone, and another disadvantage in that the stability of the controlling operation at the time of the switching of the frequency cannot be secured since it is not possible to secure a sufficiently wide hysteresis zone.

It is, therefore, an object of the present invention to provide an improved timing control device for a fuel injection pump.

It is another object of the present invention to provide a timing control device for a fuel injection pump in which the occurrence of the resonating phenomenon of the timer in the practical speed range of a fuel injection pump can be avoided so that stable control operation can be realized.

It is a further object of the present invention to provide a timing control device for a fuel injection pump in which the frequency of driving pulse signals for a timing solenoid valve is steplessly changed in the practical speed range of a fuel injection pump to avoid the occurrence of the resonating phenomenon of the timer.

According to the present invention, the frequency f of the driving pulse signal for driving a timing solenoid valve is changed in relation to the rotational speed N of a fuel injection pump so as to operate the timer outside of the zone in which the resonating phenomenon occurs. Since the relationship between the frequency f and the speed N in which the timer does not resonate can be known in advance by experiments, the device may be arranged in such a way that the data obtained by the experiments is prestored in the memory, and a driving pulse frequency which does not provoke resonating phenomenon in the timer is determined for the speed N at that time on the basis of the data stored in the memory.

According to the present invention, it is possible to arrange the timing control device so as to provide a variable frequency oscillator which produces a driving pulse signal whose output signal continuously changes in the non-resonating zone as the speed N changes in response to a signal showing the speed N, whereby the timer can be actuated smoothly without the occurrence of the resonating of the timer.

According to the present invention, occurrence of resonating phenomenon of the timer can be effectively suppressed without damaging the smoothness of the control, since the device is arranged in such a way that the frequency of the driving pulse signal for driving the timing solenoid valve for adjusting the hydraulic pressure applied to the timer is changed in response to the rotational speed of the engine, that is, the rotational speed of the fuel injection pump so as not to give rise to resonating phenomenon within the desired speed zone.

Further objects and advantages of the present invention will be apparent from the following detailed description to be read in conjunction with the accompanying drawings in which:

FIG. 4 illustrates a detailed block diagram of the injection advance detecting circuit of FIG. 3;

FIGS. 5A to 5E illustrate timing charts for the signals in FIG. 4; and

FIG. 1 illustrates a schematic block diagram of one embodiment of an electronically controlled fuel injection apparatus employing a timing control device according to the present invention including a partly sectional view of a fuel injection pump.

Figure 1:
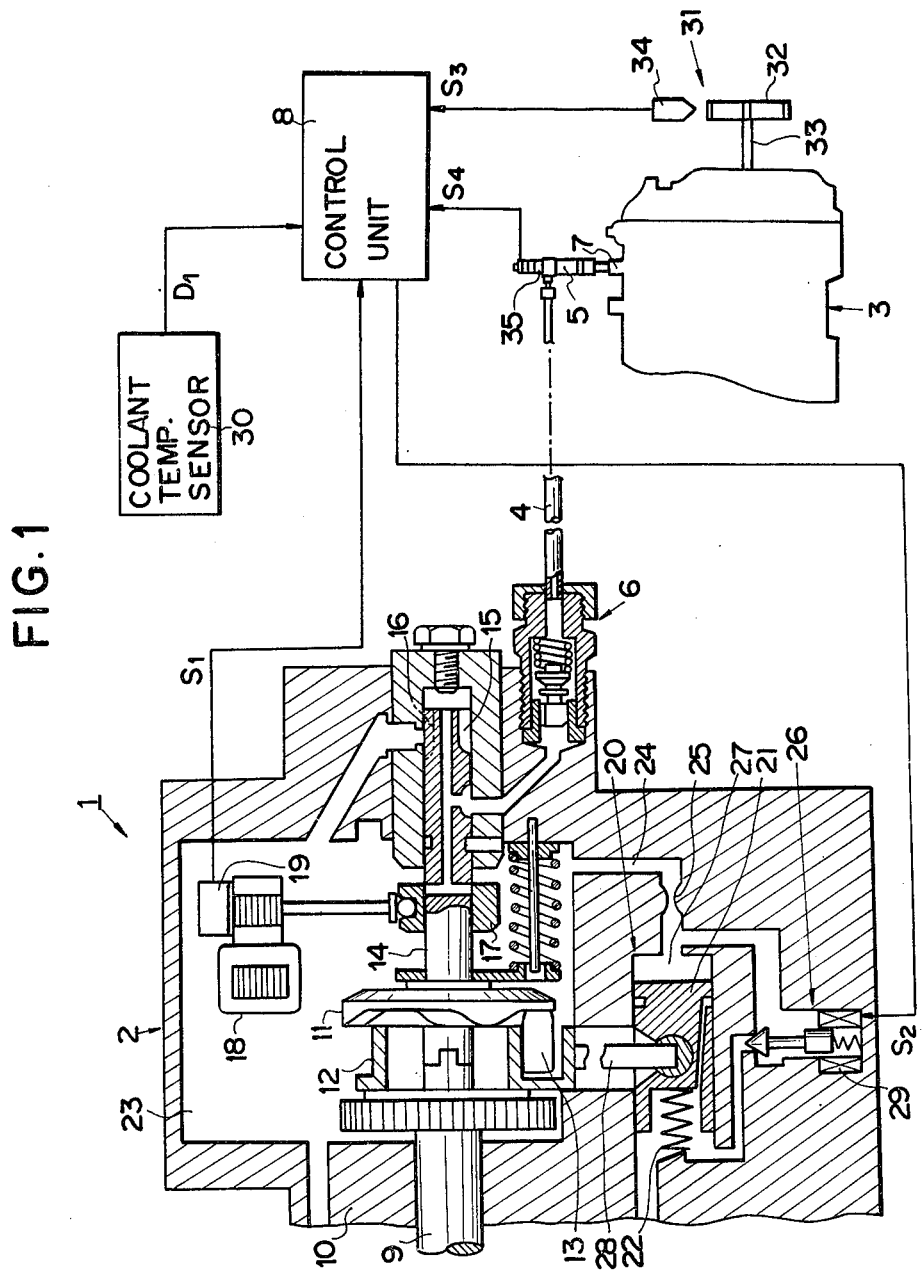
FIG. 1 is a schematic block diagram of one embodiment of an electronically controlled fuel injection apparatus of the present invention including a partly sectional view of a fuel injection pump.

An electronically controlled fuel injection apparatus 1 has a conventional distribution type fuel injection pump 2 adapted to electronically control the amount of fuel injected and the injection advance (or the timing of the beginning of fuel injection), and the fuel injection pump 2 injects fuel from a fuel tank (not shown) into the cylinders of a diesel engine 3 through injection pipes and injection nozzles. In FIG. 1, although only one injection pipe 4 and associated injection nozzle 5 are illustrated between one delivery valve 6 of the injection pump 2 and one cylinder 7 of the engine 3, the fuel is also injected into the other cylinders of the engine 3 from associated delivery valves (not shown) of the fuel injection pump 2 in a similar manner. The electronically controlled fuel injection apparatus 1 comprises a control unit 8 for electronically controlling the injection advance of the fuel injection therefrom.

The fuel injection pump 2 includes a drive shaft 9 rotatably supported by a housing 10 and driven by the engine 3, a cam disc 11 rotated by the drive shaft 9, and a roller holder 12 having a plurality of rollers (only one roller 13 is seen in FIG. 1). The cam disc 11 causes a plunger 14 to reciprocate and rotate simultaneously, in accordance with the rotation of the drive shaft 9. The plunger 14 has, at one end portion thereof, intake slits provided as many as the number of cylinders of the engine 3. (Only two intake slits 15, 16 are shown in figure.) As well known, the amount of fuel injected is adjusted by the relative position between a control sleeve 17 and the plunger 14. To permit the adjustment, the control sleeve 17 is coupled to a solenoid actuator 18 and the electric power for controlling the solenoid actuator 18 is supplied from a fuel amount control unit (not shown) whereby the position of the control sleeve 17 can be changed for freely adjusting the amount of fuel injected.

On the actuator 18, there is provided a position sensor 19 for detecting the position of the control sleeve 17 and the signal $S_1$ from the position sensor 19 is applied as a signal indicative of the amount of the load of the engine 3 into the control unit 8.

The fuel injection pump 2 has a hydraulic type timer 20 for adjusting the injection advance of fuel injected from the injection pump 2. The timer 20 has a timer piston 21 one end face of which is urged by a compression spring 22. Although the axis of the timer 20 is shown here as being parallel with that of drive shaft 9 for convenience in explaining the apparatus, in the actual apparatus, the timer 20 is located in such a way that the axis of timer piston 21 and drive shaft 9 are at right angles to each other. Pressure within a housing chamber 23 is applied to the other end face of the timer piston 21 through a passage 24 and a constriction 25. A pressure regulating solenoid valve or timing valve 26 is provided for regulating the pressure applied to timer piston 21 so as to locate the timer piston 21 at a desired position. The timing valve 26 is controlled so as to set the pressure within a cylinder chamber 27 at a desired value. The piston 21 is articulatedly connected to one end of a rod 28 whose opposite end is connected to the roller holder 12, so that the angular position of roller holder 12 may be varied according to the position of timer piston 21 thereby to control the injection advance of fuel by a driving pulse signal $S_2$ supplied from the control unit 8 to the exciting coil 29 of the timing valve 26.

Figure 3:
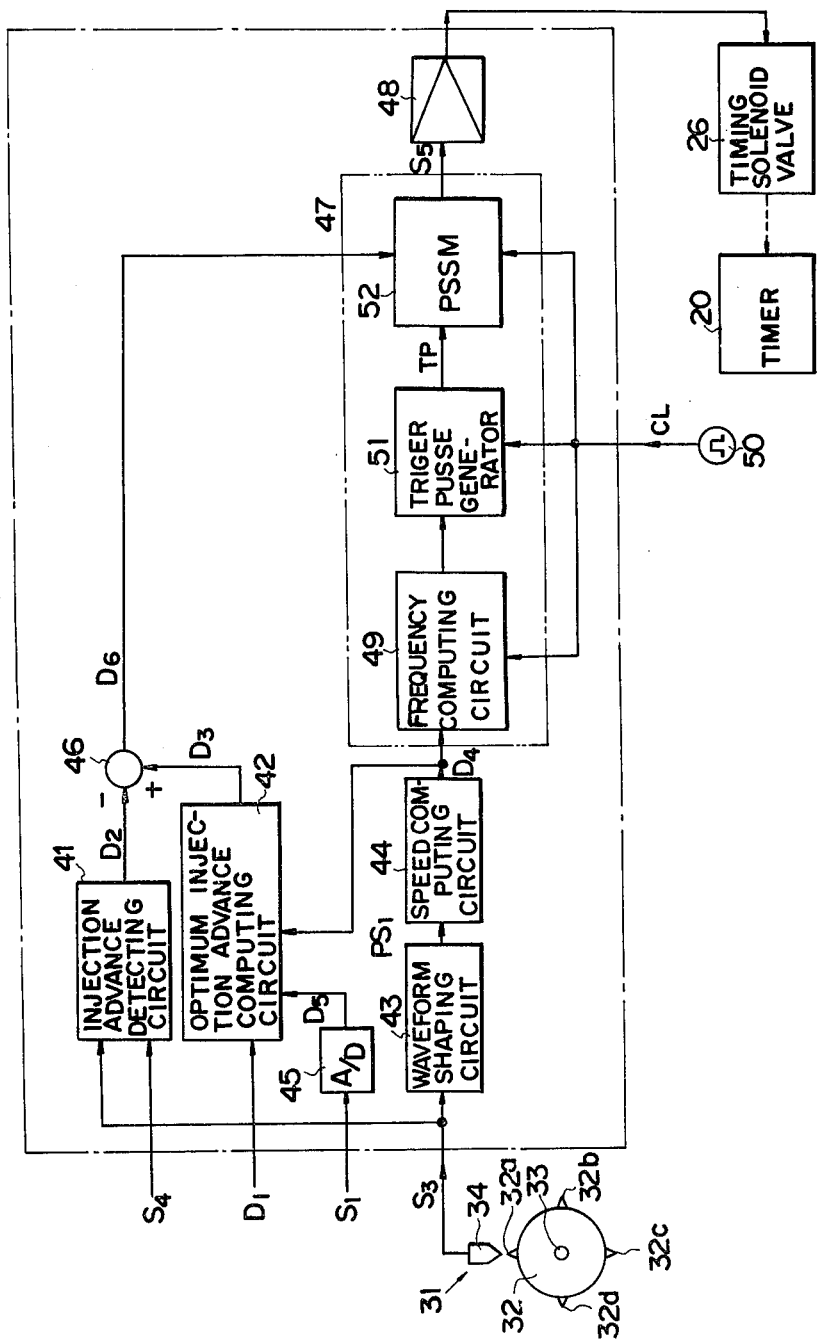
FIG. 3 illustrates a block diagram of the injection advance control system of the fuel injection apparatus shown in FIG. 1.

For detecting the engine speed and the top dead center timing of the engine 3, there is provided a conventional sensor 31 which is composed of a gear plate 32 secured to the crankshaft 33 of the engine 3 and an electromagnetic pick-up coil 34. As shown in FIG. 3, four cogs $32_a$ to $32_d$ are formed on the periphery of the gear plate 32 and an output signal $S_3$ produced from the electromagnetic pick-up coil 34 changes in level as these cogs approach the coil 34 and then depart from the coil 34 in sequence with the rotation of the engine 3. That is, the signal $S_3$ changes in frequency in accordance with the engine speed. To detect the top dead center timing of the engine by the use of the sensor 31, the gear plate 32 is secured to the crankshaft 33 in such a way that one of the cogs faces the pick-up coil 34 each time one of the pistons of the engine 3 reaches top dead center. Moreover, the fuel injection apparatus 1 has a coolant temperature sensor 30 for generating digital data $D_1$ indicative of the temperature of the coolant of the engine 3.

The injection nozzle 5 is provided with a sensor 35 for producing a timing signal $S_4$ which indicates the timing of the opening of the valve of the injection nozzle 5. The sensor 35 is composed of an induction coil and a coil which is displaced relative to the induction coil in accordance with the displacement of a needle valve (not shown) in the injection nozzle 5. Since the structure of the injection nozzle having such a detector is known in the prior art, a detailed description is omitted in this specification. The timing signal $S_4$ produced by the sensor 35 is applied to the control unit 8.

The control unit 8 computes an optimum value of injection advance for the operating condition of the engine for each instant on the basis of the data $D_1$ and the signals $S_1$, $S_3$ and $S_4$ and the duty ratio of the driving pulse signal $S_2$ is decided in such a way that the fuel injection pump 2 is operated at the injection advance based on the computed result. As a result, when the timing solenoid valve 26 is operated to open/close in accordance with the duty ratio of the driving pulse signal $S_2$, the pressure in the cylinder chamber 27 is adjusted and the angular position of the roller holder 12 is controlled to obtain the desired value of the injection advance.

In this embodiment, if the duty ratio of the driving pulse signal $S_2$ is maintained at a constant value, the position of the timer piston 21 is changed in accordance with the change in the pressure of the housing chamber 23.

Figure 2:
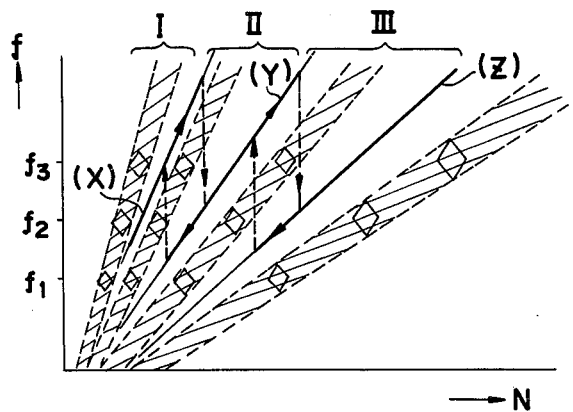
FIG. 2 is a view illustrating a resonating zone in an N-f plane.

FIG. 2 is a view showing the result of a measurement for obtaining a map showing the resonating zone in the N-f plane wherein the value of the rotational speed N of the fuel injection pump is plotted on the transverse axis and the value of the frequency f of the driving pulse signal $S_2$ is plotted on the axis of ordinate. In FIG. 2, the measured points at which the resonating phenomenon occurs are shown by the diamond marks where the each of widths of the diamond marks in the ordinate direction shows the width of the hunting operation. As will be understood from FIG. 2, the resonating phenomenon happens when the speed N and the frequency f are in a predetermined relationship. That is, the resonating phenomenon happens when the relationship between the speed N and the frequency f is in the hatched belt zone in the N-f plane.

To determine the frequency f of the driving pulse signal $S_2$ so as not to cause the timer to resonate in view of the speed N, the control unit 8 also has a function of changing the frequency f in such a way that the relationship between the speed N and the frequency f is not within the resonating zone shown in FIG. 2.

FIG. 3 is a block diagram of the control unit 8 of the fuel injection apparatus 1. The control unit 8 has an injection advance detecting circuit 41 which produces actual injection advance data $D_2$ indicative of the actual injection advance in the fuel injecting operation and an optimum injection advance computing circuit 42 for producing optimum injection advance data $D_3$ indicating the optimum injection advance at each instant on the basis of the various data concerning the condition of the engine operation which are applied to the circuit 42.

The signal $S_3$ from the sensor 31 is applied as a signal indicative of the top dead center timing of the engine 3 to the circuit 41. The timing signal $S_4$ from the sensor 35 is also applied thereto. The timing signal $S_4$ is a signal indicative of the timing of the beginning of fuel injection. In the injection advance detecting circuit 41, the actual injection advance is detected on the basis of the difference between the timing $T_1$ indicated by the timing signal $S_4$ and the top dead center timing $T_2$ indicated by the signal $S_3$ and the actual injection advance data $D_2$ is produced in digital form.

In FIG. 4, a detailed block diagram of the injection advance detecting circuit 41 is illustrated. The signal $S_3$ from the sensor 31 is put into a waveform processing circuit 101 to generate a square wave signal corresponding to the signal $S_3$. The pulse train RP from the waveform processing circuit 101 is sent through an output line 102 to a frequency multiplier 103 which is a phase locked loop (PLL) circuit. As a result, the frequency of the signal output from the waveform processing circuit 101 is multiplied and the resulting multiplied signal can be derived from the frequency multiplier 103. The signal output from the frequency multiplier 103 is applied to a pulse shaping circuit 104 to shape the waveform thereof and the resulting pulse signal CP (see, FIG. 5D) from the pulse shaping circuit 104 is applied through a line 105 to a counter 106 as count pulses.

In order to count the number of count pulses produced during the period from the time the injection nozzle 5 is opened to the time the associated crank reaches top dead center, there is provided an R-S flip-flop 107 which produces count gate pulses GP from its Q output terminal for controlling the counting operation of the counter 106 on the basis of a timing signal $S_4'$ produced by shaping the signal $S_4$ in a waveform shaping circuit 113 and reference timing pulses RP produced by the waveform processing circuit 101. As described above, since the relative positional relationship between the gear 32 and the coil 34 is such that one of the cogs of the gear 32 is opposite the coil 34 each time the associated crank is at top dead center, the coil 34 produces a signal indicative of the time the crank is at top dead center and this signal is applied to the waveform processing circuit 101 to produce the reference timing pulses indicative of top dead center timing. As the timing signal $S_4'$ is applied to the SET terminal S of the R-S flip-flop 107 and the reference timing pulses from the waveform processing circuit 102 are applied to the RESET terminal R of the R-S flip-flop 107, as illustrated in FIGS. 5A to 5C, the Q output of the R-S flip-flop 107 which is used as a count gate pulse GP assumes a high level for the period from the time when the timing signal $S_4'$ is produced at the time of $t_1$ (timing $T_1$) to the time when the reference timing pulse RP is produced at the time of $t_2$ (timing $T_2$) The counter 106 is arranged so as to be operative only during the high level state of the count gate pulse GP so that the number of pulses applied to the counter for the duration from $t_1$ to $t_2$ can be counted.

The count registered by the counter 106 is output as count data $CD_1$ and the count data $CD_1$ are applied to a latch circuit 108 also receiving latch pulses $P_1$, which are generated in a latch pulse generator 109 on the basis of the count gate pulses derived from the R-S flip-flop 107 through a line 110 (shown in FIG. 5E). Since the time when the latch pulse $P_1$ is generated is just after the counting operation of the counter 106 is inhibited by the count gate pulse GP, the resulting count data $CD_1$, which are obtained by the counting the pulses produced over a time determined by each count gate pulse, is stored in the latch circuit 108 by the application of the latch pulse, and then the latched data $CD_2$ is applied to a data converter 111 while the next data from the counter 106 is being latched in the latch circuit 108. The latched data $CD_2$ is converted into angle data indicative of the injection advance at that instant in the data converter 111. The resulting data indicative of the injection advance as an angle is derived as the actual injection advance data $D_2$.

The latch pulses from the latch pulse generator 109 are also applied through a delay circuit 112 to the counter 106 as reset pulses. Therefore, the counter 106 is reset by the reset pulses after every latching of the data $CD_1$ in the latch circuit 108 so that the counter 106 can be ready to carry out the next counting operation.

Referring to FIG. 3, the signal $S_3$ is applied to a waveform shaping circuit 43 to produce a square wave pulse signal $PS_1$ and the pulse signal $PS_1$ is fed into a speed computing circuit 44 in which the engine speed N at each instant is computed on the basis of the pulse signal $PS_1$. Data $D_4$ indicative of the engine speed D is produced from the speed computing circuit 44 and is applied to the optimum injection advance computing circuit 42. The signal $S_1$ is converted into corresponding digital data $D_5$ by the use of an A/D converter 45 and the digital data $D_5$ is also applied to the optimum injection advance computing circuit 42 which computes and produces optimum injection advance data $D_3$ in the digital form on the basis of these input data $D_1$, $D_4$ and $D_5$.

The optimum injection advance computing circuit 42 includes a memory for storing the data concerning the relationship between the input data $D_1$, $D_4$ and $D_5$ and the optimum injection advance data $D_3$.

As is well known, the optimum injection advance depends upon the conditions of the engine operation at each instant, and the relationship between the optimum injection advance and the operating conditions of the engine, such as engine speed, coolant temperature and the like, can usually be determined experimentally. In this embodiment, data $D_1$, $D_4$ and $D_5$ are applied to the computing circuit 42 in the form of digital data, and the optimum injection advance at that time is computed in the computing circuit 42 on the basis of these input data. The computing circuit 42 includes a memory in which the data concerning the above relationship obtained in the way mentioned above are stored and the optimum injection advance can be selected in accordance with the set of input digital data mentioned above. There is known an electronic circuit which includes a memory for storing the resulting data determined by the input data in advance and which can output the stored data corresponding to the input data from the memory when the input data is applied to the electronic circuit as address data. It is one of the prior art techniques to store the resulting data in advance at the address of the memory designated by the input data corresponding to the resulting data and to obtain the resulting data by applying the input data to the memory as address data. (See, for example, U.S. Pat. No. 3,689,753.) Then, optimum injection advance data $D_3$ indicating the computed result in the circuit 42 is output in a digital form.

The data $D_3$ is input to an adder 46 to add the data $D_3$ to the actual injection advance data $D_2$ with the polarities shown in FIG. 3. As a result, an error data $D_6$, indicating the difference between the actual injection advance and the computed optimum injection advance, is produced. The error data $D_6$ is applied to a driving pulse signal generator 47 which produces a pulse signal $S_5$. The pulse signal $S_5$, the duty ratio of which varies in accordance with the data $D_6$, is applied to the timing valve 26 as the driving pulse signal $S_2$ after being amplified by an amplifier 48. The change of the actual injection advance caused by the operation of the timer 20 is fed back as a change in the actual injection advance data $D_2$ to the adder 46, and then, the timer 20 is controlled in such a way that actual injection advance is made coincident with the optimum injection advance.

In order to change the frequency f of the pulse signal $S_5$ produced from the driving pulse signal generator 47 in accordance with the rotational speed N of the fuel injection pump at each instant to avoid the resonating phenomenon of the timer in the practical speed range of the fuel injection pump, the driving pulse signal generator 47 is provided with a frequency computing circuit 49. The data $D_4$ indicative of the speed N is applied to the frequency computing circuit 49 which computes a frequency of the driving pulse signal $S_5$ by which the timer can be operated without occurrence of the resonating phenomenon on the basis of the data $D_4$. Then the frequency computing circuit 49 produces a control data $D_7$ by which a trigger pulse generator 51 is controlled so as to produce the trigger pulse signal TP with a frequency computed in the frequency computing circuit 49.

The driving pulse signal generator 47 also has a programable single shot circuit (PSS) 52 triggered by the trigger pulse signal TP and the PSS circuit 52 is triggered every time one of the pulses of the trigger pulse signal TP is applied thereto and produces a pulse with a pulse width determined by the data $D_6$.

A common clock pulse signal CL from a clock pulse generator 50 is applied to the frequency computing circuit 49, the trigger pulse generator 51 and the PSS circuit 52.

As a result, the driving pulse signal generator 47 produces the pulse signal $S_5$ having a frequency computed by the frequency computing circuit 49 and a duty ratio necessary for making the actual injection advance coincident with the target injection advance.

The PSS circuit 52 can use an outer trigger type timer and the trigger pulse generator 51 can use a free-running oscillating type timer. For these, there can be employed, for example, an MC 6840 (manufactured by Motorola Semiconductor Products Inc.) or an 8253 (manufactured by Intel Inc.), both of which are available as programable timers for general use.

The computing operation of the frequency computing circuit 49 will be described in conjunction with FIG. 2. As described hereinbefore, the resonating phenomenon of the timer occurs for specific relationships between the speed N of the fuel injection pump and the frequency f of the driving pulse signal $S_2$, and the zones in which the timer will operate in the resonating state are designated by hatched zone in the N-f plane. Therefore, in the frequency computing circuit 49, the value of the frequency f for the speed N at each instant is computed in such a way that the combination of the speed N and the frequency f does not occur in any of the resonating zones during the desired speed range of the fuel injection pump. In this embodiment, there are provided three characteristic curves X, Y and Z by which the relationship between N and f is generally expressed by the following equation:

$$f = k_1 N + k_2 \quad (1)$$

Wherein, $k_1$ and $k_2$ are constants. These three characteristic curves are in the non-resonating zone in the N-f plane and one of the curves X, Y and Z are used in view of the response characteristic of the timing valve 26. In this embodiment, the practical speed range of the fuel injection pump is divided into a low speed zone I, a middle speed zone II and a high speed zone III and the characteristic curve X is selected for speeds in zone I, the characteristic curve Y for speeds in zone II and the characteristic curve Z for speeds in zone III. To assure stable operation of the timer at the time of change of the frequency f, the hysteresis characteristics are employed, so that the charge-over speed at the time one characteristic curve is changed to another curve depends upon whether the speed N is increasing or decreasing. Synthetic characteristics between the speed N and the frequency f are shown by the use of the thick lines in FIG. 2.

For carrying out such a control of the frequency of the driving pulse signal $S_2$, it is required to obtain the resonating zone of the timer in the N-f plane by experiment in advance, and to determine the three sets of values of $k_1$ and $k_2$ in such a way that the equation (1) can be established in a non-resonating zone in the N-f plane. Then, the computation of the frequency of the driving pulse signal can be carried out by selecting one set of constant values $k_1$ and $k_2$ in the frequency computing circuit 49 in response to the value of the speed N. In this case, for realizing the hysteresis characteristics, the charge-over speed for changing from one set of constant values $k_1$ and $k_2$ to another is not constant, but is decided by taking into account the increasing/decreasing tendency of the speed N at that time. Such computation can be easily carried out using a microprocessor.

In the embodiment described above, one of the characteristic curves X, Y and Z is selected in accordance with the value of the speed N. However, it is possible to use only one characteristic curve, for example, curve Z for the desired speed range of the fuel injection pump. Although the characteristic curve X or Y can of course be also employed, in this case, since the value of the frequency f is remarkably increased for the high speed range III, it may be required to use a solenoid valve with especially good response characteristics.

For employing a circuit arrangement in which the N-f characteristic curve is not changed, it is possible to use a D/A converter for producing a d.c. voltage having a level corresponding to the data $D_4$ instead of the frequency computing circuit 49 and to use a voltage controlled oscillator whose oscillating frequency depends upon the output voltage of the D/A converter instead of the trigger pulse generator 51. As a result, the circuit structure can be simplified.

Figure 6:
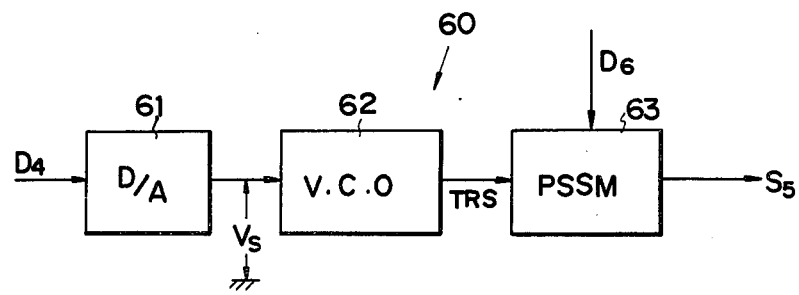
FIG. 6 is a block diagram showing another embodiment of the driving pulse signal generator.

FIG. 6 shows a block diagram of an embodiment of the driving pulse generator according to the above mentioned arrangement. A driving pulse signal generator 60 comprises a D/A converter 61 for converting the speed data $D_4$ into a corresponding analog voltage signal $V_s$ and a voltage controlled oscillator 62 whose output frequency varies in accordance with the level of the analog voltage signal $V_s$. The characteristics of the D/A converter 61 and the voltage controlled oscillator 62 are set in such a way that the relationship between the speed N shown by the data $D_4$ and the frequency of the output signal of the voltage controlled oscillator 62 corresponds to the characteristic curve Z of FIG. 2. Consequently, the driving pulse signal generator 60 can produce a trigger pulse signal TRS whose frequency is decided by the characteristic curve Z of FIG. 2 in accordance with the speed N. The trigger pulse signal TRS is applied to a programable single shot circuit 63 which is the same type circuit as the PSS circuit 52 of FIG. 3 and which produces a pulse signal $S_5$ whose frequency is controlled by the trigger pulse signal TRS and whose duty ratio is controlled in accordance with the data $D_4$.

With this arrangement, since the frequency of the driving pulse signal for opening/closing the timing valve 26 is continously changed in accordance with the rotational speed of the fuel injection pump to prevent the timer from resonating, the timing valve 26 can be operated without discontinuity of the frequency of the driving pulse signal. Even when the circuit is so arranged that the frequency of the driving pulse signal is changed in accordance with the rotational speed of the fuel injection pump, the frequency of the change-over operation of the frequency of the driving pulse signal is extremely low and a sufficient width of hysteresis at the change-over of the characteristic curves can be obtained. As a result, the controlling operation of the timer can be performed in a stable condition without the occurrence of the resonating phenomenon.

We claim:

1. A timing control device for a fuel injection pump, which has a hydraulic type timer for operating a member for adjusting the injection advance of the fuel injection pump of an internal combustion engine and is arranged in such a manner that the injection advance is adjusted in accordance with the duty ratio of a driving pulse signal applied to a timing valve of said hydraulic type timer, said device comprising:
   a first means for producing a first signal indicative of the rotational speed of said fuel injection pump;
   a second means for producing a second signal indicative of the duty ratio of said driving pulse signal necessary for obtaining the optimum injection advance at each instant in accordance with the operating conditions of said internal combustion engine and said fuel injection pump; and
   a signal generator for generating said driving pulse signal, said signal generator being arranged in such a way that the frequency of said driving pulse signal is controlled in accordance with said first signal so as not to give rise to resonation during the operation of said timer and the duty ratio is controlled in accordance with said second signal.

2. A device as claimed in claim 1 wherein said signal generator has a frequency computing means responsive to said first signal for computing a frequency of said driving pulse signal at which the resonation of said timer does not occur for the rotational speed of said injection pump at each instant, a trigger pulse generator for providing a trigger pulse signal whose frequency is determined in accordance with the output data from said frequency computing means, and a programable single shot circuit for producing a pulse signal whose frequency is decided in accordance with said trigger pulse signal and whose duty ratio is decided in accordance with said second signal.

3. A device as claimed in claim 2 wherein said frequency computing means is a circuit responsive to said first signal for computing a frequency corresponding to the rotational speed of said fuel injection pump at each instant on the basis of a formula expressing a relationship between the rotational speed of said fuel injection pump and the frequency of said driving pulse signal for which resonation of said timer does not occur.

4. A device as claimed in claim 3 wherein said formula is as follows:

$$f = k_1 N + k_2$$

where N is the rotational speed of said fuel injection pump, f is the frequency of said driving pulse signal, and $k_1$ and $k_2$ are constants.

5. A device as claimed in claim 2 wherein said frequency computing means has a third means for computing the frequency of said driving pulse signal in accordance with any one of a number of predetermined formulas each expressing a relationship between the rotational speed of said fuel injection pump and the frequency of said driving pulse signal for which resonation of said timer does not occur and means responsive to said first signal for selecting a desired one of said formulas in accordance with the rotational speed of the fuel injection pump, and the result of the computation based on the selected formula is derived as said second signal.

6. A device as claimed in claim 5 wherein said formula is as follows:

$$f = k_1 N + k_2$$

where N is the rotational speed of said fuel injection pump, f is the frequency of said driving pulse signal, and $k_1$ and $k_2$ are constants.

7. A device as claimed in claim 1 wherein said first signal is output as a voltage signal whose level varies with the change of the rotational speed of said fuel injection pump, and said trigger pulse generator is a voltage controlled oscillator whose oscillating frequency is controlled in response to said first signal.

8. A device as claimed in claim 1 wherein said second means has a fourth means for computing a target injection advance value of said fuel injection pump which is the optimum value for the operating condition of said internal combustion engine at each instant, a fifth means for detecting the actual injection advance value of said fuel injection pump and means responsive to the outputs from said fourth and fifth means for producing error data corresponding to the difference between the target injection advance and the actual injection advance, and the error data is output as said second signal.

* * * * *